United States Patent
Fennell et al.

(10) Patent No.: US 11,124,926 B2
(45) Date of Patent: Sep. 21, 2021

(54) PAVEMENT REPAIR METHOD AND SYSTEM THEREOF

(71) Applicant: KRATON POLYMERS LLC, Houston, TX (US)

(72) Inventors: Brian Fennell, Palm Beach Garden, FL (US); Martin Thompson, Oakwood, OH (US); Christopher Holmes, Savannah, GA (US)

(73) Assignee: Kraton Polymers LLC, Houston, TX (US)

( * ) Notice: Subject to any disclaimer, the term of this patent is extended or adjusted under 35 U.S.C. 154(b) by 417 days.

(21) Appl. No.: 16/261,758

(22) Filed: Jan. 30, 2019

(65) Prior Publication Data
US 2019/0242069 A1    Aug. 8, 2019

Related U.S. Application Data

(60) Provisional application No. 62/625,716, filed on Feb. 2, 2018.

(51) Int. Cl.
*E01C 11/00* (2006.01)
*E01C 19/17* (2006.01)
*E01C 7/35* (2006.01)
*E01C 7/18* (2006.01)

(52) U.S. Cl.
CPC ............ *E01C 11/005* (2013.01); *E01C 7/187* (2013.01); *E01C 7/35* (2013.01); *E01C 7/353* (2013.01); *E01C 19/17* (2013.01); *E01C 19/176* (2013.01)

(58) Field of Classification Search
CPC .......... E01C 11/005; E01C 7/187; E01C 7/35; E01C 7/353; E01C 19/17; E01C 19/176
See application file for complete search history.

(56) References Cited

U.S. PATENT DOCUMENTS

| | | | | |
|---|---|---|---|---|
| 2,256,639 | A | * 9/1941 | Erickson | E01C 19/176 239/124 |
| 4,684,289 | A | * 8/1987 | Gnesa | E01C 11/005 404/75 |
| 4,793,731 | A | * 12/1988 | Gnesa | E01C 11/005 156/575 |
| 5,354,148 | A | * 10/1994 | Reymonet | E01C 19/176 404/102 |

(Continued)

FOREIGN PATENT DOCUMENTS

| | | |
|---|---|---|
| EP | 2966128 A1 | 1/2016 |
| WO | 2016/138384 A1 | 9/2016 |
| WO | 2017/083614 A1 | 5/2017 |

*Primary Examiner* — Abigail A Risic

(57) ABSTRACT

A method for repairing/treating a pavement with the use of a rheologically modifier is disclosed. The method comprises first applying a layer of a rheologically modifier composition comprising a rejuvenating component onto the top surface of the pavement that needs repair, then applying a second layer of an asphaltic binder onto the rheologically modifier layer. The second layer of asphaltic binder effectively seals the rheologically modifier layer with the rejuvenating component for intimate contact with the top pavement surface, thus penetrating the surface layer to extend the life of the pavement surface, arresting the deterioration of visco-elastic properties and restoring some of those properties.

19 Claims, 1 Drawing Sheet

(56) References Cited

U.S. PATENT DOCUMENTS

| | | | |
|---|---|---|---|
| 5,503,871 A * | 4/1996 | Blacklidge | C08L 95/005 |
| | | | 106/277 |
| 5,893,679 A * | 4/1999 | Durand | E01C 19/176 |
| | | | 404/108 |
| 5,957,621 A | 9/1999 | Clark, Jr. et al. | |
| 6,624,232 B2 | 9/2003 | Wilson, Sr. | |
| 7,438,764 B1 * | 10/2008 | Hill | E01C 19/176 |
| | | | 118/313 |
| 9,109,332 B1 * | 8/2015 | Stone, Jr. | E01C 23/06 |
| 9,845,579 B2 * | 12/2017 | Pembleton | B05B 1/20 |
| 9,890,299 B1 * | 2/2018 | Spray | C09D 195/00 |
| 2002/0058734 A1 | 5/2002 | Harlan | |
| 2003/0194273 A1 * | 10/2003 | Lloyd | E01C 23/065 |
| | | | 404/83 |
| 2003/0203995 A1 | 10/2003 | Wilson, Sr. | |
| 2009/0137705 A1 | 5/2009 | Faucon Dumont et al. | |
| 2012/0043401 A1 * | 2/2012 | Heusinger | E01C 19/178 |
| | | | 239/722 |
| 2014/0338565 A1 | 11/2014 | Severance et al. | |
| 2015/0240081 A1 | 8/2015 | Grady et al. | |
| 2016/0138228 A1 * | 5/2016 | Rainwater | E01C 19/176 |
| | | | 404/111 |
| 2017/0190898 A1 | 7/2017 | Puchalski et al. | |

\* cited by examiner

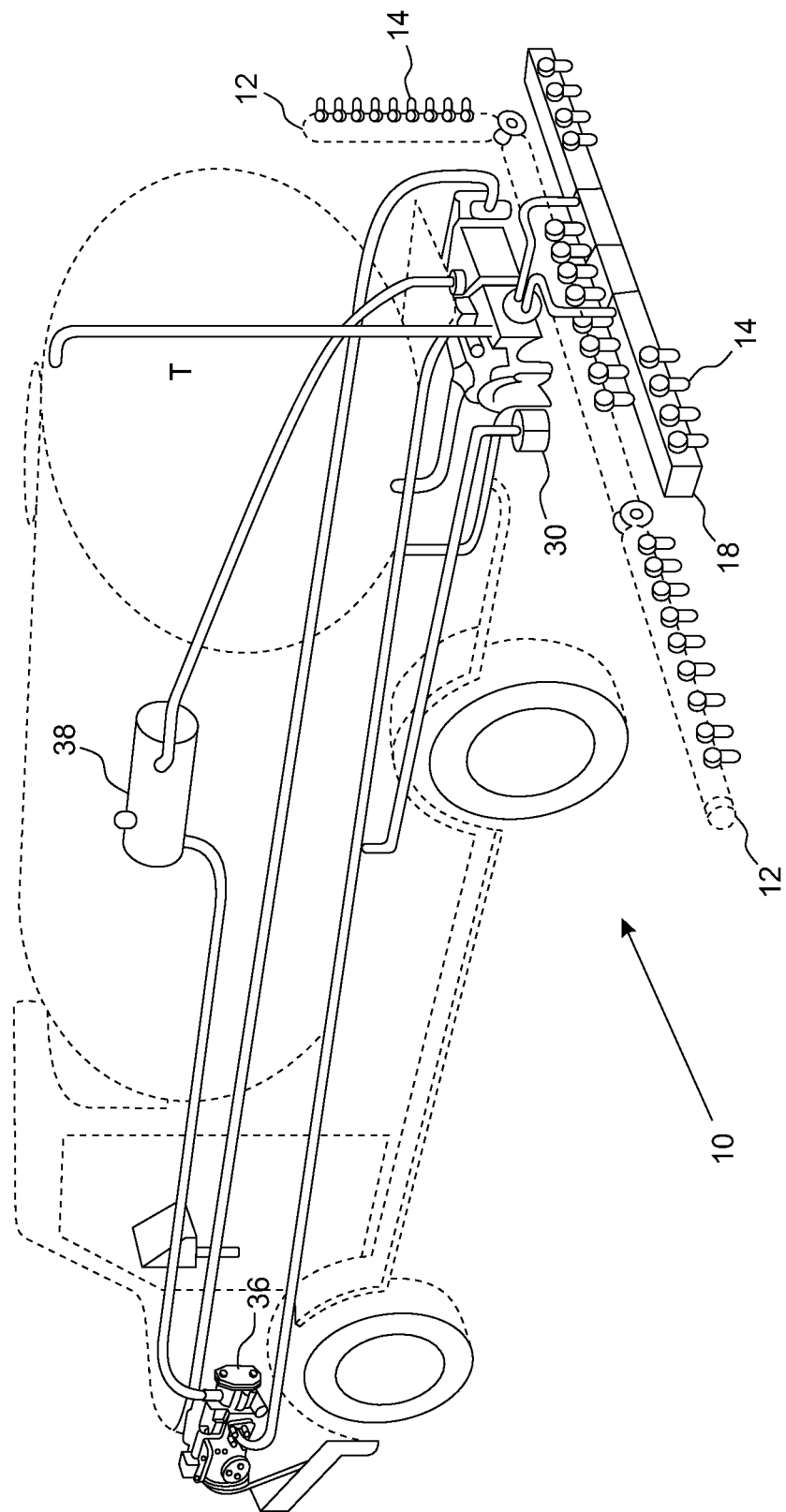

PAVEMENT REPAIR METHOD AND SYSTEM THEREOF

RELATED APPLICATIONS

This application claims priority from U.S. Provisional Application No. 62/625,716, with a filing date of Feb. 2, 2018, the entire disclosures of which is incorporated herein by reference for all purposes.

FIELD

The present disclosure relates to a pavement repair/treating method using asphalt rejuvenating agents, and a system for repairing asphalt pavements.

BACKGROUND OF THE INVENTION

The majority of pavements are composed of asphalt concrete (AC) and/or Portland cement concrete (PCC). In the latter periods of their design service life, both types of pavements exhibit cracking distresses, e.g., fatigue and thermal cracking in AC pavements, and faulting and mid-slab cracking in the case of PCC pavements. In the prior art, fog seals may be employed as a cost effective approach to repair the pavements. The fog seals penetrate the surface layer to an extent dependent on the surface characteristics, reduce the stiffness of the oxidized asphalt pavement surface and migrate into the existing asphalt binder to extend the life of the pavement surface.

There is still a need for improved methods to repair pavements, by arresting or delaying the deterioration of visco-elastic properties of the pavements, while simultaneously rejuvenating, or restoring some of the pavements' original properties.

SUMMARY OF THE INVENTION

In one aspect, a method to repair pavements is disclosed. The method comprises: applying to the top surface of the pavement a first layer of a rheology modifying composition comprising a rejuvenating component; applying a second layer of an asphaltic binder onto the rheologically modifier layer; wherein the first layer and the second layer are applied in succession, employing an application system having at least a first spray bar for applying the rheology modifying composition onto the top surface of the pavement layer first, and a second spray bar and/or a tertiary spray bar for distributing the asphaltic binder on top of and covering the rheologically modified layer, thereby sealing the rheologically modified layer(s) onto the surface of the pavement.

In another aspect, a pavement coating to protect a pavement with a top surface needing repair is disclosed. The coating comprises successive layers of: a first layer of a rheologically modified composition comprising a rejuvenating component, the first layer having a thickness of 0.01 cm to 0.5 cm; a second layer of an asphaltic binder bonding to the first layer and sealing the rheologically modified layer onto the top surface of the pavement, the second layer having a thickness of 0.01 cm to 5 cm; wherein the first layer with the rheologically modified composition achieves the a decrease in viscosity similar to what is outlined in the US Army Corps of Engineers (USACE) unified facilities guide specification (UFGS) for bituminous rejuvenation. This specification (UFGS 02787) suggests that the asphalt binder recovered from the upper 9.5 mm of the treated pavement shall exhibit a decrease in viscosity with respect to untreated material.

In yet another aspect, a system to repair pavements is disclosed. The system comprises: at least a spray bar for applying onto the top surface a first layer of a rheology modifying composition comprised of a rejuvenating component; at least a second spray bar and/or a tertiary spray bar for applying a layer of an asphaltic binder onto the rheologically modified layer; wherein the second spray bar or tertiary spray bar applies the layer of an asphaltic binder in succession after the first spray bar is used to apply the rheology modifying composition onto the surface of the pavement. Additional applications of the rheology modifying composition may be applied in succession after the first application.

BRIEF DESCRIPTION OF THE DRAWINGS

FIG. 1 is a perspective view of a system with a vehicle for use in conjunction with a system and method to repair pavements in the disclosure.

DESCRIPTION

The following terms will be used throughout the specification and will have the following meanings unless otherwise indicated.

"Asphalt" refers to a composite material comprising a bituminous binder and/or bituminous binder and aggregate, which is generally used for paving applications. Such asphalt is also known as "asphalt concrete." Examples of asphalt grades used in paving applications include stone mastic asphalt, soft asphalt, hot rolled asphalt, dense-graded asphalt, warm mix asphalt, gap-graded asphalt, porous asphalt, mastic asphalt, and other asphalt types. Typically, the total amount of bituminous binder in asphalt is from 1 to 20 wt. % based on the total weight of the asphalt, in some cases from 0.1 to 20.0 wt. %.

"Pavement" as used herein means all possible transportation surfaces, refer to a surface which can be repaired including, aircraft runways and taxiways, roadways, walkways, bicycle paths, curbs, steps, parking lots, oil rig decks, and warehouse floors. The surface can be concrete, asphalt or tile based. "Pavement" may be used interchangeably with "road."

"Pavement preservation" refers to a proactive maintenance of roads to prevent them from getting to a condition where major rehabilitation or reconstruction is necessary. A pavement preservation application may be any of fog seal, slurry seal, micro-surfacing, chip seal, scrub seal, cape seal, and combinations thereof wherein an asphalt emulsion with optional additives is applied onto an existing road or pavement as a "seal" to seal the surface.

"Emulsion" generally refers as a multiphase material in which all phases are dispersed in a continuous aqueous phase. The aqueous phase may comprise surfactants, acid, base, thickeners, and other additives. The dispersed phase may comprise thermoplastic natural and synthetic polymers, waxes, asphalt, other additives including rheological modifier(s), optionally petroleum based oils or mixtures thereof, herein collectively referred to as the "oil phase." High shear and energy can be used to disperse the oil phase in the aqueous phase using apparatus such as colloidal mills.

"Fog seal" is a pavement preservation application of an asphalt emulsion via a spray application ("fogging").

"Slurry seal" refers to a pavement preservation application wherein a mixture of water, asphalt emulsion, and aggregate is applied to an existing asphalt pavement surface. A slurry seal is similar to a fog seal except the slurry seal has aggregates as part of the mixture for a "slurry" and slurry seals are generally used on residential streets.

"Microsurfacing" refers to a form of slurry seal, with the application of a mixture of water, asphalt emulsion with additives, aggregate (very small crushed rock), and additives to an existing asphalt concrete pavement surface. A difference between slurry seal and microsurfacing is in how they "break" or harden. Slurry relies on evaporation of the water in the asphalt emulsion. The asphalt emulsion used in microsurfacing contains additives which allow it to break without relying on the sun or heat for evaporation to occur, for the surface to harden quicker than with slurry seals.

"Chip seal" refers a pavement preservation application wherein first asphalt emulsion is applied then a layer of crushed rock is applied to an existing asphalt pavement surface. "Chip seal" gets its name from the "chips" or small crushed rock placed on the surface.

"Scrub seal" refers to a pavement preservation application that is very close to a chip seal treatment where asphalt emulsion and crushed rock are placed on an asphalt pavement surface. The only difference is that the asphalt emulsion is applied to the road surface through a series of brooms placed at different angles. These brooms guide the asphalt emulsion into the pavement distresses to ensure sealing the road. These series of brooms, known as a "scrub broom", give the treatment its title, "scrub seal."

"Cape seal" is a combination of applications, e.g., an application of a chip or scrub seal followed by the application of slurry seal or microsurfacing at a later date.

"Rheological modifying composition" and/or "rheologically modified composition" generally refers to a composition or blend that can be used in asphalt compositions for road and pavement applications including but not limited to new construction, partial or complete re-construction, rehabilitation, preservation, e.g., in asphalt emulsion compositions, or in combination with aged binder or reclaimed asphalt (or their mixtures with virgin binder and/or virgin asphalt) to modify flow or other properties of the aged binder or reclaimed asphalt and, in some cases, restores some or most of the original properties of virgin binder or virgin asphalt.

"Rubberized asphalt" refers to an asphalt mix, e.g., hot-mixed asphalt, containing polymeric materials such as crumb rubber. In some embodiments, the crumb rubber utilized is generated from processing scrap tires, wherein the tires are shredded and the steel enforcement and fibers are separated from the rubber. In some embodiments, the crumb rubber serves as a modifier for the asphalt and gives the asphalt greater viscosity and may improve cracking properties. The term "asphalt" includes rubberized asphalt.

"Cut back" or cutback asphalt refers to a composition comprising asphalt cement and petroleum solvent which reduces the asphalt viscosity for lower temperature use, along the line of asphalt emulsions, e.g., for tack coats, fog seals, slurry seals applications, etc.

"Hot applied" refers to a high temperature blend of asphalts with additives added to promote adhesion and improve low temperature flexibility, which cures or solidifies upon cooling.

"Asphaltic binder" refers to any of emulsions (e.g., for tack coats, fog seals, slurry seals, chip seals, cape seals, etc.) cutback, hot applied composition and mixtures thereof.

"Rejuvenator" or "rejuvenating component" or "rejuvenating composition" refers to a composition that can penetrate the asphalt's surface layer and replace certain oils, e.g., lost bitumens, that may have been lost in the asphalt due to exposure to weather, wear-and-tear, etc. A rejuvenator can penetrate the existing surface layer and revitalize the viscoelastic properties, resulting in increased strength and durability of the asphalt in the existing layer.

In the disclosed pavement repair method, a rheological modifying composition is first applied to the pavement for the rejuvenating component to directly interact with the pavement, whereby the direct contact allows penetration and migration into the upper pavement layer. Subsequently, an asphaltic binder is applied to seal the rheologically modified layer with the rejuvenating component onto the pavement, maximizing its restoration effectiveness on the pavement. In the method, a secondary spray bar system can be used to distribute/apply the rheologically modified composition prior to the application of the asphaltic binder.

System for Pavement Repair:

The pavement repair method can be implemented with a system as disclosed in U.S. Pat. No. 5,957,621, incorporated herein by reference in its entirety. The system can be a wheeled, motor-driven vehicle 10 as illustrated in FIG. 1, comprising a tank or tanks for carrying liquid material(s), a first spray bar 12 for discharging the rheological modifier first onto the pavement, and a second spray bar 18 for discharging the asphaltic binder onto the pavement after a portion of top surface is covered by the rheological modifier. The spray bars can be constructed with multiple-sections such that some can be extended onto the road, or folded up at a ninety-degree angle when not in use (as shown for a section of spray bar 12). The system includes hydraulic motors and pumps 30 for the spray bars, with the spray bars being independently controllable to apply rheological modifier(s), asphaltic binder(s) or other suitable materials to the pavement at different rates and/or different locations on the pavement. The spray bars may include a multiplicity of spray nozzles (14) for applying liquid materials. A tank (T) carries the asphaltic binder, which is pumped to the second spray bar. A second tank (38) can be employed to carry the rheological modifier, for spraying the road with the first spray bar 12.

The system can be provided with control panels (not shown) for the operation of the pumps, motors, valves, and nozzles, using switches and circuits known in the art.

Additional tanks can be used (not shown) with the system for spraying the pavement with different compositions, e.g., different rheological modifier compositions or different additives, e.g., breaking agents, etc. More than two spray bars (not shown) can also be used for spraying/covering the pavement with different compositions or layers of asphaltic binder(s), rheological modifier(s), breaking agent(s), and the like. More than two spray bars (not shown) can be used for each material, being arranged at angles and/or overlapping to maximize the coverage path of the pavement. Each spray bar can have sections each of least 2 feet in length, and up to 10 feet in length for maximizing coverage of the pavement, or widths of the road. The spray bar is typically provided with at least 3 nozzles per foot of coverage or spraying of the pavement.

Depending on the materials to be sprayed for covering the pavement, the pavement condition, conditions, etc., the spray rates can be continuous or intermittent, with the spray bars all operating continuously, or some operating continuously and some intermittently. In one embodiment, the spray rates for the materials is in the range of 0.01 to 1 gallon per square meter. The spray rates of the additional spray bars can be the same or different, being set such that the asphaltic binder being sprayed or applied to cover the rheological modifier after it is applied or sprayed onto the pavement.

It should be noted that other systems and apparatuses can be used in conjunction with, or instead of the disclosed system for repairing pavements, e.g., chip spreaders or chip and seal pavers equipped with auxiliary spray bar(s) or other types of spreaders for the spreading of the rheological modifier as the first layer for the pavement; chip spreader(s) of fiber spreader(s) with auxiliary spray bar(s) or roller(s) for the spraying/spreading of rheological modifier(s) prior to the spreading/compaction of the asphaltic binder, thus sealing the rheological modifier(s) onto the pavement. Depending on the layer(s) to be spread or applied onto the road, the spreaders/rollers may be operated for a displacement velocity ranging from 3 m/min to 10 m/min to 30 m/min to 150 m/min.

Method for Pavement Repair—Compositions:

The rejuvenating component in a rheological modifying composition is first applied onto the pavement to restore or recover much of the original characteristics or properties of the pavement, prior to being subsequently sealed by the application of an asphaltic binder. After sealing with the application of an asphaltic binder, the pavement can be opened for use with traffic, or have an additional overlay, e.g., another asphaltic binder layer of the same or different compositions, or the application of breaking agents, sealers, or the like.

Rheologically Modified Layer:

The first layer to be applied onto the payment surface is a rheological modifier, with a key component being a rejuvenator. The rejuvenator provides a decrease in viscosity similar to what is outlined in the U.S. Army Corps of Engineers (USACE) unified facilities guide specification (UFGS) for bituminous rejuvenation. This specification (UFGS 02787) suggests that the asphalt binder recovered from the upper 9.5 mm of the treated pavement shall exhibit a decrease in viscosity with respect to untreated material.

In one embodiment, the rejuvenator is characterized as having a compaction temperature greater than 90° C. for a pavement with a RAP (recycled asphalt pavement) content of up to 100%. The rheological modified composition containing the rejuvenator as applied can reduce required compaction temperature of pavement, e.g., as much as 20° C. in a pavement with high RAP content. The rheological modifier containing the rejuvenator when applied onto a pavement can reduce its glass transition onset temperature of at least 5° C.

In one embodiment, the rejuvenator is characterized as having a polymeric distribution having about 2 to about 80 wt. % oligomer content; a polydispersity index ranging from about 1.0 to about 5.0; and a sulfur content less than about 8 wt. %.

The rejuvenator can be petroleum based oil, such as naphthenic oils, or sustainably sourced oil such as a vegetable-based oil. Suitable plant oils can include tall oil, corn oil, canola oil, soy oil, biodiesel oils, nut oils, nut shell oils, nut shell liquids, and nut shell liquid pitch.

In one embodiment, the rejuvenator comprises a tall oil material. The tall oil material can be produced using various tall oil streams, e.g., crude tall oil (CTO) or tall oil pitch (TOP). The tall oil may be first modified, either by distillation and/or by distillation.

In one embodiment, the rejuvenator comprises an alkyl ester of one or more starting oil materials as disclosed in Patent Application No. PCT/US2016/019,777 (Patent Publication No. WO2016/138,384 or US20180044528), incorporated herein by reference where applicable. In embodiments, the starting oil is a biorenewable oil including oils isolated from plants, animals, and algae. Examples of plant-based oils may include but are not limited to soybean oil, linseed oil, canola oil, rapeseed oil, castor oil, tall oil, cottonseed oil, sunflower oil, palm oil, peanut oil, safflower oil, corn oil, corn stillage oil, lecithin (phospholipids) and combinations, distillates, derivatives, and crude streams thereof. Examples of animal-based oils may include but are not limited to animal fat (e.g., lard, tallow) and lecithin (phospholipids), and combinations, distillates, derivatives, and crude streams thereof. In embodiments, biorenewable oils also include partially hydrogenated oils, oils with conjugated bonds, and bodied oils wherein a heteroatom is not introduced, for example but not limited to, diacylglycerides, monoacylglycerides, free fatty acids (and distillate streams thereof), alkyl esters of fatty acids (e.g., methyl, ethyl, propyl, and butyl esters), diol and triol esters (e.g. ethylene glycol, propylene glycol, butylene glycol, trimethylolpropane), and mixtures and derivative streams thereof. In embodiments, the oils can be functionalized by introduction of a heteroatom (oxygen, nitrogen, sulfur, and phosphorus). In embodiments, the starting oil material comprises a polymerized oil comprising: (i) a polymeric distribution having about 2 to about 80 wt % oligomer content; (ii) a polydispersity index ranging from about 1.0 to about 5.0; and (iii) sulfur content between about 0.01 wt % and 8 wt %. The starting oil materials are selected from the group consisting of palm oil, sunflower oil, corn oil, soybean oil, canola oil, rapeseed oil, linseed oil, tung oil, castor oil, tall oil, cottonseed oil, peanut oil, safflower oil, corn oil, animal fat, lecithin (phospholipids), and combinations, derivatives and crude streams thereof.

In one embodiment, the rejuvenator comprises an ester-functional rejuvenating agent derived from tall oil, e.g., a tall oil fatty acid (TOFA) or a TOFA derivative (e.g., a TOFA dimer acid) as disclosed in U.S. Patent Application Nos. U.S. 2015/0240081 A1 and US 2014/0338565 A1, incorporated herein by reference where applicable. The rejuvenating agent has a cyclic content of at least 5 wt. %. The rejuvenating agent has an acid portion comprising C8-C20 fatty acids with some degree (often a high degree) of unsaturation. The fatty acid can be in a polymerized form, as in dimerized fatty acid mixtures, such as oleic acid, linoleic acid, linolenic acid, and palmitic acid; as well as monomer acid, dimer acids, tall oil heads, and the like, and mixtures thereof. The alcohol portion of the rejuvenating agent can be primary, secondary, or tertiary; it can be a monol, diol, or polyol. The alcohol can also derive from phenolate esters as well as polyethers such as triethylene glycol or polyethylene glycols.

Mixtures of different rejuvenators can be used, e.g., a mixture of castor oil based rejuvenator in combination with an ester-functional rejuvenating agent derived from tall oil. Examples of rejuvenating agents include those available from Cargill Incorporated under the Agri-Pure™ brand and the Anova™ brand asphalt rejuvenators, and those available from Kraton Chemical, LLC under the SYLVAROAD™ brand.

The rejuvenator can be used either on a neat basis or in combination with a polymer as disclosed in US2017/0190898, incorporated herein by reference where applicable, for a maximum viscosity of <2,000 cP at 180° C. when measured at 6.8/seconds shear rate. The amount of rejuvenator to polymer ranges from 20:80 to 80:20, with the polymer being selected from elastomers or plastomers suitable for asphalt applications, e.g., natural rubber (NR), isoprene rubber (IR), styrene-butadiene rubber (SBR), chloroprene rubber (CR), butadiene rubber (BR), nitrile butadiene rubber (NBR), isobutylene-isoprene rubber (IIR), ethylene-propylene diene monomer (EPDM), urethane rubber (UR), silicone rubber (SR), fluorocarbon rubber (FR), styrene-isoprene-styrene rubber (SIS), styrene-butadiene-styrene rubber (SBS), styrene-ethylene/butylene-styrene (SEBS), styrene-ethylene/propylene-styrene (SEPS), ethyl vinyl acetate (EVA), graft copolymers of EVA with another monomer, hot melt polyamide resin, maleic anhydride grafted SEBS rubber, polychloroprene, polyurethanes, thermoplastic olefins, thermoplastic polyamides and mixtures thereof. In one embodiment, the polymer is a styrenic block copolymer comprising a mixture of diblock, triblock, and/or multiarm block copolymers.

In one embodiment, the rheological modified layer further comprises at least an antioxidant, e.g., an antioxidant system with primary and/or secondary antioxidants. Examples of primary antioxidants include hindered phenol or arylamines. Examples of secondary antioxidants include phosphites and thiosynergists.

The rejuvenator can be used either on a neat basis in the rheological modified layer, or in combination with an emulsion system in an amount from 10-80 w. % of the rheology modifying composition, depending on the rejuvenator used. The emulsifier can be cationic, anionic, or nonionic, or mixtures thereof. In one embodiment, the rejuvenator is used in combination with a surfactant. In one embodiment, the surfactant is an alkoxylated fatty amine as disclosed in EP2966128 A1, incorporated herein by reference where applicable. The term "fatty amine" as used herein includes amines, diamines, and polyamines. The fatty amine can be an ethoxylated fatty amine, a propoxylated fatty amine, a butoxylated fatty amine, and mixtures thereof.

Asphaltic Binder Layer:

After the rheology modifying composition is spread or sprayed onto the pavement, an asphaltic binder and/or emulsified asphaltic binder layer is applied. The asphaltic binder and/or emulsified asphaltic binder composition can be used in any application of tack coats, fog seals, slurry seals, chip seals, cape seals, cutback, hot applied, etc., applications. The emulsified asphaltic binder is a substantially homogeneous mixture of asphalt droplets suspended in a continuous phase. It can be divided in three categories: anionic, cationic, and nonionic. A typical emulsified asphaltic binder composition would comprise bitumen, polymers in an amount ranging from 1 to 20 wt. %, optional resins (0 to 20 wt. %), emulsifying agents, optional aggregates (up to 90 wt. %), optional additives including rejuvenating agents. The polymer may be added to a continuous aqueous phase, or the asphalt phase, or both.

Other optional additives may include mineral fillers and polyphosphoric acid (PPA). In one embodiment, the optional additive is as disclosed in U.S. Patent App. No. US2009/0137705A1, added to lower the viscosity of the asphaltic binder (e.g., solvent properties) and can thus improve low-temperature properties, e.g., cooling of processing temperatures at temperature of use. Drying agents can be added as optional additives to accelerate the drying reaction of the plasticizer, e.g., metal salts such as organic salts of cobalt, manganese and zirconium.

Exemplary asphaltic binder compositions are as disclosed in Patent Publication Nos. US2001/0058734 A1, US2017/0190898 A1, US2002/0058734A1, WO2017/083,614, incorporated herein by reference.

The polymer optionally comprises various block polymers or block copolymers, which can include linear and/or radial and/or star constituents. The polymer in one embodiment comprises styrene, but not limited to polymers comprising styrene butadiene styrene (SBS).

The asphaltic binder and/or emulsified asphaltic binder optionally comprises resins and resin derivatives. Examples include rosins, rosin esters, dimer resin esters, and products obtained by reacting a rosin ester with an amine. The asphaltic binder may optionally include a viscosity reducer comprising an alcohol, e.g., a polyol.

The bitumen or asphaltic component of the layer include bitumen, natural asphalt, petroleum oil, paving grade oil residue, plastic residue from coal tar distillation, petroleum pitch, asphalt cements diluted with solvents (cut-back asphalt), semi-blown asphalt, petroleum tar, pitch, solvent-deasphalting asphalt, heavy, and mixtures thereof.

Optional Breaking Agent Layer:

A breaking agent can be applied within, or on top of the applied emulsified asphaltic binder layer, or as an intermediate layer between the rheological modifier and the asphaltic binder layers. The selection of the breaking agent depends on the composition of the rheological modifier and/or the emulsified asphaltic binder. The breaking agent helps with the rapid breakdown of the emulsified asphaltic binder layer, minimizing gluing residues which might stick to tires or vehicles that would drive on the freshly spread layers. In one embodiment of a cationic emulsified asphaltic binder layer, the breaking agent is a solution as disclosed in U.S. Pat. No. 5,893,679, incorporated herein by reference. An example is an aqueous solution, with concentration ranging between 5 and 35%. with a strong mineral base, such as sodium hydroxide or an anionic surface-active agent such as an alkyl sulphate (C10-C20) or mixtures thereof.

Optional Sealant Layer:

A sealant layer can be optionally applied on top of the applied asphaltic binder layer as a sealing layer to further protect the pavement, particularly the asphalt, from oxidation, water, ice and snow. In one embodiment, the sealant layer comprises a mixture of polymer resin blended with a powder mixture of cement and slag, or with cement and silica sand, as disclosed in U.S. Patent Publication No. US20030203995A1 and U.S. Patent No. U.S. Pat. No. 6,624,232B2, incorporated herein by reference.

Method for Pavement Repair—Applications:

The rheologically modified composition, the asphaltic binder compositions, and the optional breaking agent may be generated with conventional mixing equipment used in the paving industry. The compositions may be applied to pavement using conventional spreading or spraying techniques/equipment, and/or using the system/apparatus as previously described. One of both layers can be applied by pouring and/or distributed using sprayers, or one layer can be applied and/or distributed with a sprayer (e.g., the rheological modifier) and the second layer can be applied and compressed with heavy rollers, with or without vibration.

Depending on the composition of the rheological modifying composition and the asphaltic binder, the type of pavement, the condition of the pavement, the surface condition, etc., the recommended application rate may be, for example, about 0.1 kg/m$^2$ to about 5 kg/m$^2$ of the rheologically modified layer or a thickness ranging from 0.05 cm to about 0.5 cm or from 0.1 cm to about 2 cm, or at least 0.1 cm, or less than 2 cm, or less than 1 cm, followed by 1 kg/m$^2$ to 50 kg/m$^2$ of the asphaltic binder or a thickness ranging from about 0.5 cm to 10 cm, or 1 cm to 10 cm, or at least 3 cm, or less than 15 cm. The breaking agent, if used, can be applied at a rate ranging from 50 g/m² to 500 g/m². The top sealing layer, if used, can be applied for a thickness of 1/64" to 1/4" thickness, or 1/32" to 1" thickness, or less than 1/2" thickness.

The pavement repair method is not limited to pavement repair using mechanized spreading/layering approach. It can also be used for pot hole repair (after filling the pot hole first with aggregate/surfacing materials), crack repair, and the like, with a manual (or mechanical-assisted) application of the first layer of a rheological modifying composition and followed by an asphaltic binder layer.

Unless defined otherwise, all technical and scientific terms used herein have the same meanings as commonly understood by one with skill in the art to which the disclosed disclosure belongs. As used herein, the term "comprising" and variations thereof as used herein is used synonymously with the term "including" and variations thereof and are open, non-limiting terms, meaning including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference

The invention claimed is:

1. A method for repairing or treating a pavement having a top surface, the method comprising:
applying to the top surface a first layer of a rheology modifying composition comprising a rejuvenating component;
applying a second layer of an asphaltic binder onto the first layer of a rheology modifying composition;
wherein the first layer and the second layer are applied in succession employing an application system having at least a first spray bar to apply the rheology modifying composition onto the top surface, and at least a second spray bar to apply the asphaltic binder on top of and covering the first layer of a rheology modifying composition, thereby sealing the rheology modifying composition onto the top surface; and
wherein the top surface has a reduction in glass transition onset temperature of at least 5° C. after the application of the first layer of a rheology modifying composition.

2. The method of claim 1, further comprising:
applying a third layer of a breaking agent onto the second layer of an asphaltic binder.

3. The method of claim 1, further comprising:
applying a third layer of a sealing composition onto the second layer of an asphaltic binder.

4. The method of claim 1, wherein the first layer of a rheology modifying composition is applied for a thickness of 0.05 cm to about 0.5 cm on top of the top surface.

5. The method of claim 1, wherein the first layer of a rheology modifying composition is applied at a rate of about 0.1 kg/m² to about 5 kg/m² onto the top surface.

6. The method of claim 1, wherein the second layer of an asphaltic binder is applied for a thickness from about 0.5 cm to 5 cm to cover the first layer of a rheology modifying composition.

7. The method of claim 1, wherein applying a first layer of a rheology modifying composition comprises applying a rheologically modified composition having a sufficient amount of a rejuvenating component for a decrease in viscosity in the asphaltic binder as specified in UFGS 02787.

8. The method of claim 1, wherein applying a first layer of a rheology modifying composition comprises applying a rheologically modifier composition having a sufficient amount of a rejuvenating component for a needle penetration value (0.1 mm) at 25° C. in the range of 1-100.

9. The method of claim 1, wherein applying a first layer of a rheology modifying composition comprises applying a rheology modifying composition comprising a rejuvenator selected from the group of: a) naphthenic oils; b) plant oils; c) a tall oil selected from crude tall oil (CTO) and tall oil pitch (TOP); d) an alkyl ester of one or more starting plant oil materials; e) an ester-functional rejuvenating agent derived from tall oil, having a cyclic content of at least 5 wt. %, and an acid portion comprising C8-C20 fatty acids with some degree of unsaturation; and mixtures thereof.

10. The method of claim 1, wherein applying a second layer of an asphaltic binder comprises applying an asphalt emulsion composition employed in any of tack coats, fog seals, slurry seals, chip seals, cape seals, cutback, and hot applied applications.

11. The method of claim 10, wherein applying a second layer of an asphaltic binder comprises applying an asphalt emulsion of a substantially homogeneous mixture of asphalt droplets suspended in a continuous phase.

12. The method of claim 10, wherein applying a second layer of an asphaltic binder comprises applying an asphalt emulsion comprising: bitumen, polymers in an amount ranging from 1 to 20 wt. %, resins in an amount of 0 to 20 wt. %, emulsifying agents, and aggregates of up to 99 wt. %.

13. The method of claim 2, wherein applying a third layer of a breaking agent onto the second layer of an asphaltic binder comprising applying a composition containing between 5 and 35% of solution selected from a mineral base, an anionic surface-active agent, and mixtures thereof.

14. The method of claim 3, wherein applying a third layer of a sealing composition onto the second layer of an asphaltic binder comprises applying a mixture of polymer resin blended with a powder mixture of cement and slag, or with cement and silica sand.

15. A pavement coating to protect or treat a pavement with a top surface, the pavement coating comprises successive layers of:
- a first layer of a rheology modifying composition comprising a rejuvenating component, the first layer having a thickness of 0.05 cm to 2 cm;
- a second layer of an asphaltic binder bonding to and sealing the first layer onto the top surface of the pavement, the second layer having a thickness of 0.5 cm to 10 cm;
- wherein the first layer of a rheologically modified composition has a needle penetration value (0.1 mm) at 25° C. in the range of 1-100; and
- wherein the top surface of the pavement has a reduction in glass transition onset temperature of at least 5° C. after the application of the first layer of a rheology modifying composition.

16. The pavement coating of claim 15, wherein the rheology modifying composition comprises a sufficient amount of a rejuvenating component for a decrease in viscosity in the asphaltic binder as specified in UFGS 02787.

17. The pavement coating of claim 15, wherein the rheology modifying composition comprises a rejuvenating component selected from the group of: a) naphthenic oils; b) plant oils; c) a tall oil selected from crude tall oil (CTO) and tall oil pitch (TOP); d) an alkyl ester of one or more starting plant oil materials; e) an ester-functional rejuvenating agent derived from tall oil, having a cyclic content of at least 5 wt. %, and an acid portion comprising C8-C20 fatty acids with some degree of unsaturation; and mixtures thereof.

18. The pavement coating of claim 15, wherein the second layer of an asphaltic binder comprises an asphalt emulsion composition for use in any of tack coats, fog seals, slurry seals, chip seals, cape seals, cutback, and hot applied applications.

19. The method of claim 1, wherein the rejuvenating agent is selected from the group of an alkyl ester of one or more starting plant oil materials, alkyl esters of fatty acids, diol and triol esters, and mixtures and derivative streams thereof.

* * * * *